US011992922B2

(12) United States Patent
Choi et al.

(10) Patent No.: US 11,992,922 B2
(45) Date of Patent: *May 28, 2024

(54) GRASPING TOOL

(71) Applicant: INOOBI, INC., Harbor City, CA (US)

(72) Inventors: Wanki Kevin Choi, Harbor City, CA (US); Adam C. Miller, Los Angeles, CA (US)

(73) Assignee: INOOBI, INC., Harbor City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,098

(22) Filed: Apr. 20, 2023

(65) Prior Publication Data

US 2023/0256570 A1 Aug. 17, 2023

Related U.S. Application Data

(63) Continuation of application No. 17/704,963, filed on Mar. 25, 2022, now Pat. No. 11,660,730, which is a (Continued)

(51) Int. Cl.
*A47G 21/10* (2006.01)
*B25B 9/02* (2006.01)

(52) U.S. Cl.
CPC ................ *B25B 9/02* (2013.01); *A47G 21/10* (2013.01)

(58) Field of Classification Search
CPC .... A47G 21/10; A47G 21/103; A47G 21/106; A47J 43/283; B25B 9/02
See application file for complete search history.

(56) References Cited

U.S. PATENT DOCUMENTS 993,720 A 5/1911 Schneider
1,607,204 A 11/1926 Linzmaier
(Continued)

FOREIGN PATENT DOCUMENTS

CN 201150424 Y 11/2008
GB 2183990 A 6/1987
(Continued)

OTHER PUBLICATIONS

Korean Intellectual Property Office (KIPO) for Application No. 10-2022-7011120, dated Apr. 4, 2022.
(Continued)

*Primary Examiner* — Dean J Kramer
(74) *Attorney, Agent, or Firm* — MARSHALL, GERSTEIN & BORUN LLP

(57) ABSTRACT

A grasping tool (10) has a pair of elongate arms (20) attached via a hinge element (26). The elongate arms (20) provide gripping surfaces (28) for grasping an item therebetween. A finger engagement element (30) extends from each of the elongate arms, (20) spaced a distance from the proximal end (22). Each elongate arm (20) is generally disposed on a first axis, and each finger engagement element (30) is disposed around a second axis, such that the second axis is approximately parallel to and located below the first axis, such that the first and second axes are spaced a distance such that the pair of elongate arms (20) are positioned above the fingers of the user when the user's fingers are positioned through the finger engagement elements (30).

5 Claims, 5 Drawing Sheets

Related U.S. Application Data continuation of application No. 17/316,237, filed on May 10, 2021, now Pat. No. 11,511,395.

(60) Provisional application No. 63/090,537, filed on Oct. 12, 2020.

(56) References Cited

U.S. PATENT DOCUMENTS

| | | | | |
|---|---|---|---|---|
| 2,819,521 | A | 1/1958 | Parker | |
| 3,888,006 | A | 6/1975 | Roberts | |
| 4,261,608 | A | 4/1981 | Bradshaw | |
| 4,286,514 | A | 9/1981 | Wilson | |
| 5,375,488 | A | 12/1994 | Baitner | |
| 6,129,398 | A | 10/2000 | Calhoun | |
| 6,131,977 | A | 10/2000 | Sacks et al. | |
| 6,895,639 | B1 | 5/2005 | Bayton | |
| 7,182,378 | B2 | 2/2007 | Inomata et al. | |
| 7,249,793 | B1 | 7/2007 | Jabr | |
| D657,636 | S | 4/2012 | Carr et al. | |
| 9,192,258 | B2 | 11/2015 | Parks et al. | |
| 9,833,091 | B2 | 12/2017 | Gardeski | |
| D839,689 | S | 2/2019 | Ichishi et al. | |
| D869,912 | S | 12/2019 | Liu | |
| D884,438 | S | 5/2020 | Rose | |
| 11,511,395 | B2 * | 11/2022 | Choi | A47G 21/10 |
| 11,660,730 | B2 * | 5/2023 | Choi | B25B 9/02 294/99.2 |
| 2002/0096899 | A1 | 7/2002 | Kang | |
| 2005/0082855 | A1 | 4/2005 | Baxter | |
| 2005/0099031 | A1 | 5/2005 | Park | |
| 2007/0197066 | A1 | 8/2007 | Chang | |
| 2008/0036226 | A1 | 2/2008 | Yoon | |
| 2010/0049243 | A1 | 2/2010 | Luh | |
| 2018/0368597 | A1 | 12/2018 | Liu | |
| 2019/0090670 | A1 | 3/2019 | Luh | |

FOREIGN PATENT DOCUMENTS

| | | | |
|---|---|---|---|
| JP | 2017153634 | A | 9/2017 |
| JP | 2018143696 | A | 9/2018 |
| KR | 1020120017110 | | 2/2012 |

OTHER PUBLICATIONS

Korean Office Action No. 10-2022-7011120, dated Dec. 14, 2022.

Nov. 1, 2022 Non-final Office action, U.S. Appl. No. 11/704,963.

* cited by examiner

GRASPING TOOL

This application is a continuation of U.S. patent application Ser. No. 17/704,963, filed Mar. 25, 2022, which is a continuation of U.S. patent application Ser. No. 17/316,237, filed May 10, 2021, and entitled "Grasping Tool", issued Nov. 29, 2022 as U.S. Pat. No. 11,511,395, which claims the benefit of the filing date of U.S. Provisional Patent Application No. 63/090,537, filed Oct. 12, 2020, and entitled "Grasping Tool". Each of U.S. patent application Ser. Nos. 17/704,963, 17/316,237 and U.S. Provisional Appl. No. 63/090,537, is hereby incorporated by reference in its entirety.

BACKGROUND OF THE INVENTION

Field of the Invention

This invention relates generally to grasping tools, and more particularly to tools for picking up objects with as food products without using one's fingers.

Description of Related Art

The prior art teaches a wide range of griping tools and utensils, including a variety of chopsticks, and other similar eating tools. Examples include the following: Park (US 2005/0099031) teaches a pair of training chopsticks that include first and second sticks and a coupling means. The first stick has a thumb-inserting hole for inserting the thumb and a first pad for picking up solids. The thumb-inserting hole is formed on the upper side of the first stick and the first pad is formed on the lower end of the first stick. The second stick has a holding unit for inserting the forefinger and the second finger, an adjusting means for adjusting the fixing position of the holding unit and a second pad for picking up solids. The holding unit has a forefinger-inserting hole for inserting the forefinger and a second finger-inserting hole for inserting the second finger.

Inomata et al. (U.S. Pat. No. 7,182,378) teaches an assist tool for chopsticks comprising an adapter which couples upper and lower chopsticks such that distal end portions thereof can be opened and closed about rear end portions thereof serving as fulcrums; and a supporter which is fitted to a vicinity of a base of a user's forefinger to support the adapter on the base.

The prior art teaches tongs/forceps and chopstick trainers. However, the prior art does not teach a grasping tool that engages the fingers such that the device is positioned above the hand, as described herein, to free the fingers for use in other activities, such as using a computer. The present invention enables a user to grasp an object, such as a food product, and operate a computer or engage in other activities, without getting the food products on the computer keyboard, mouse, or other tools. The present invention fulfills these needs and provides further advantages as described in the following summary.

SUMMARY OF THE INVENTION

The present invention teaches certain benefits in construction and use which give rise to the objectives described below.

The present invention provides a grasping tool for enabling a user to grasp a snack without using his or her fingers. The grasping tool comprises a pair of elongate arms, each having a proximal end and a distal end, wherein the proximal ends of the pair of elongate arms are attached via a hinge element, and a gripping surface formed at the distal end of each of the elongate arms. The gripping surfaces of the elongate arms are shaped and configured for grasping the snack therebetween. A finger engagement element extends from each of the elongate arms, spaced a distance from the proximal end. Each elongate arm is generally disposed on a first axis, and each finger engagement element is disposed around a second axis, such that the second axis is approximately parallel to and located below the first axis, such that the first and second axes are spaced a distance such that the pair of elongate arms are positioned above the fingers of the user when the user's fingers are positioned through the finger engagement elements.

A primary objective of the present invention is to provide a grasping tool having advantages not taught by the prior art.

Another objective is to provide a grasping tool that is positioned on a user's hand such that he or she can easily grab various items, such as food products or other items, while the user's fingers remain free for engaging in other tasks.

A further objective is to provide a grasping tool which keeps food products from getting on a computer keyboard, mouse, or any other tools a user might be using.

A further objective is to provide a grasping tool that enables a chef or other food preparer to manipulate food products without using his or her fingers, and without interrupting the flow of other food preparation work.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a grasping tool for enabling a user to grasp a food product, such as a snack food or other form of food, without touching the snack with his or her fingers.

Figure 1:
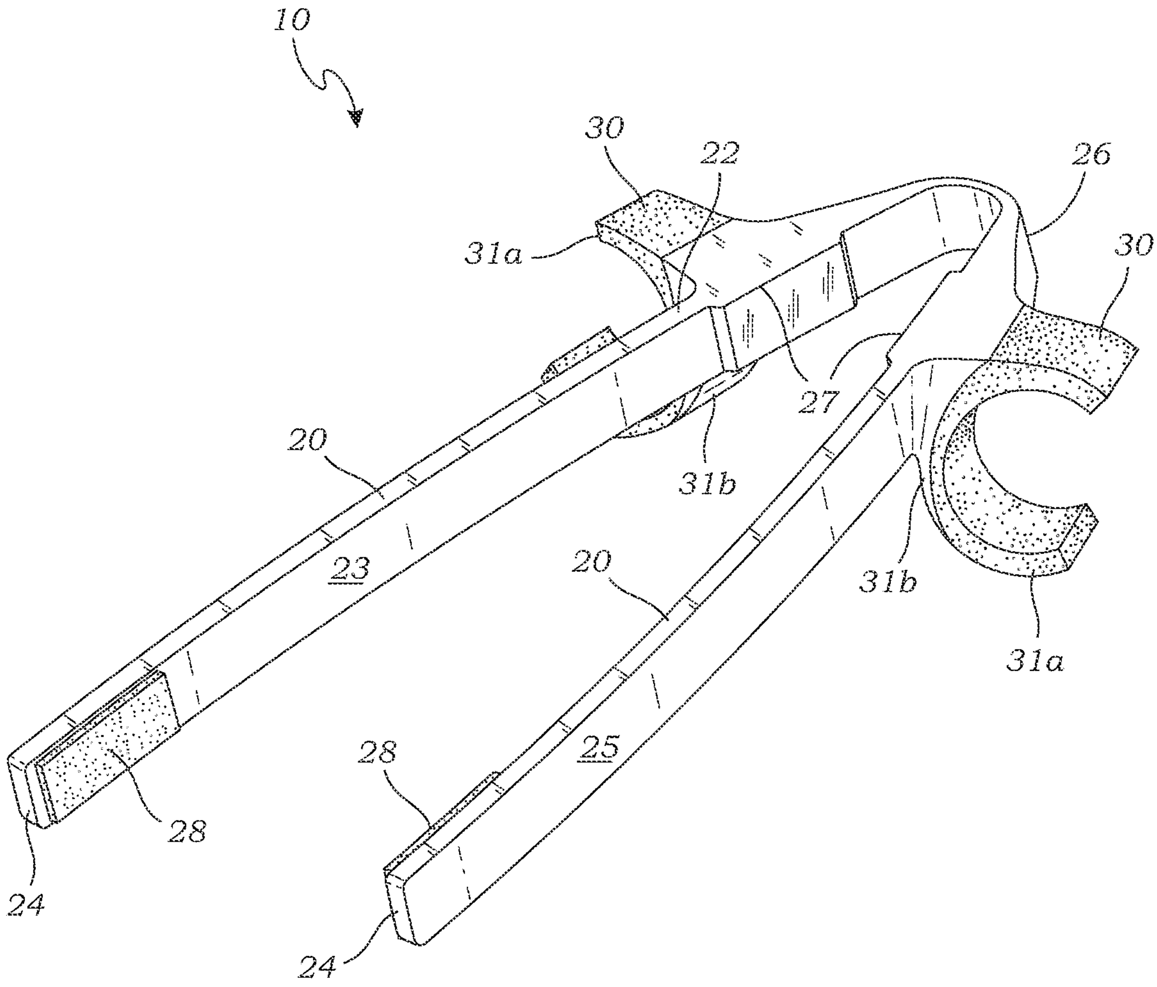
FIG. 1 is a perspective view of a grasping tool according to one embodiment of the present invention.

FIG. 1 is a perspective view of a grasping tool 10 according to one embodiment of the present invention. As shown in FIG. 1, in this embodiment, the grasping tool 10 comprises a pair of elongate arms 20 each having a proximal end 22 and a distal end 24, wherein the proximal ends 22 of the pair of elongate arms 20 are attached via a hinge element 26, and each distal end 24 includes a gripping surface 28, the gripping surfaces 28 being shaped and configured for grasping an item 12 (shown in FIG. 2) therebetween. The grasping tool 10 further includes a finger engagement element 30 extending from each of the elongate arms 20 and spaced a distance from the proximal end 22, also described in greater detail below.

As shown in FIG. 1, in this embodiment, each elongate arm 20 comprises an inner surface 23 and an outer surface 25, and further is generally disposed on a first axis A1 (although there may be some curvature to the arms 20. The hinge element 26 that joins the pair of elongate arms 20 may be in the form of a living hinge, wherein the elongate arms 20 may be constructed of a suitable plastic, and formed as a single piece, preferable co-molded with silicone or rubber, as discussed above.

In other embodiments, the hinge element 26 is a spring hinge or other form of hinge known in the art, so long as a user can squeeze the pair of elongate arms 20 together and the grasping tool 10 will return to the original shape when released.

In some embodiments, as shown in FIG. 1, a contact pad 27 is formed on the inner surface 23 of each elongate arm 20 adjacent the hinge element 26 for when the grasping tool 10 is squeezed together. The gripping surface 28 at the distal end 24 of each elongate arm 20 may be formed on the inner surface 23 and/or the outer surface 25, and may further be provided in the form of a special material (e.g., rubber, foam, etc.), pad, textured surface, dip, teeth, etc. However, alternatively, the gripping surfaces 28 may not include additional features, and are continuous with the rest of the elongate arms 20.

In this embodiment, the grasping tool 10 may be in a general "V" shape. However, in other embodiments, the elongate arms 20 may be in different configurations, e.g., parallel arms, irregular/asymmetrical arms, round arms, etc. In this embodiment, the finger engagement elements 30 are each generally "C" shaped, comprising an upper end 32 and a lower end 34, but in alternative implementations, the finger engagement elements 30 may comprise only the upper end 32, or other cross-section shapes may be used, one example being shown in FIG. 6 and discussed in greater detail below.

As shown in FIG. 1, the finger engagement elements 30 may be formed by co-molding the generally rigid material 31*b* (e.g., plastic, vinyl, etc.) of the grasping tool 10 with a resilient material 31*a* (e.g., silicone, rubber, etc.) to form at least part of the finger engagement elements 30. The finger engagement elements 30 may be provided in a variety of finger sizes, or they may be sufficiently flexible to fit different finger sizes, or they may be adjustable. For example, the flexible material may be initially set for average-sized fingers but be capable of expanding for larger-sized fingers.

Figure 2:
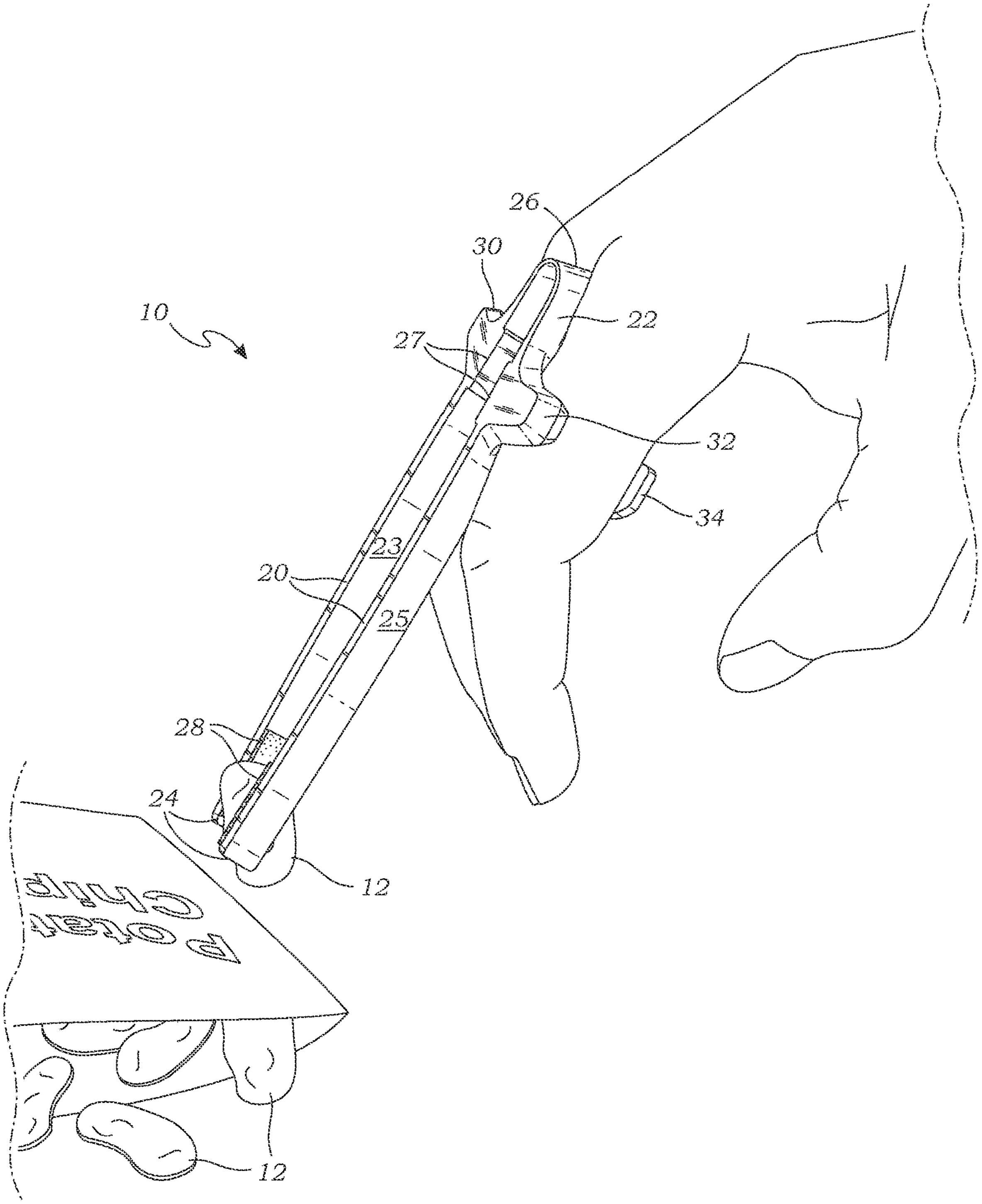
FIG. 2 is a perspective view of the grasping tool with a person's fingers positioned through finger engagement elements of the grasping tool.

FIG. 2 is a perspective view of the grasping tool with a person's fingers positioned through finger engagement elements of the grasping tool, wherein the grasping tool 10 is further shown grasping the item 12. While the item 12 in this embodiment is a food product, such as a snack, it might be any other item that might be desired to be grasped without using the user's fingers.

As shown in FIG. 2, in use, the c-shaped finger engagement elements 30 receive the user's fingers, wherein the upper ends 32 sit on top of the fingers. In this position, the grasping tool 10 is biased in the general "V" shape, and the user's hand is free to perform most activities normally. The user may then reach for any suitably sized food item and squeeze the elongate arms 20 of the grasping tool 10 together to grip the food item with the gripping surfaces 28. In this manner, the user may deliver food to his or her mouth without having to touch the food item with bare hands, which may result in needing to clean the hands prior to returning to an activity. The grasping tool 10 may be used with any desired food item, but may be especially useful for foods which leave crumbs/seasoning/residue when eaten with bare hands (e.g., popcorn, cheese puffs, chips, nuts, etc.).

As shown in FIG. 2, the finger engagement elements 30 are positioned to receive the user's index and middle fingers, respectively, at the proximal phalanx part of the finger. The upper end 32 of the c-shaped finger engagement elements 30 rests on top of the finger, and the lower end 34 curves around the bottom of the finger, such that the elongate arms 20 are positioned above and generally parallel to each of the fingers. Alternatively, the finger engagement elements 30 may be positioned to receive different phalanges or fingers of the hand.

Figure 3:
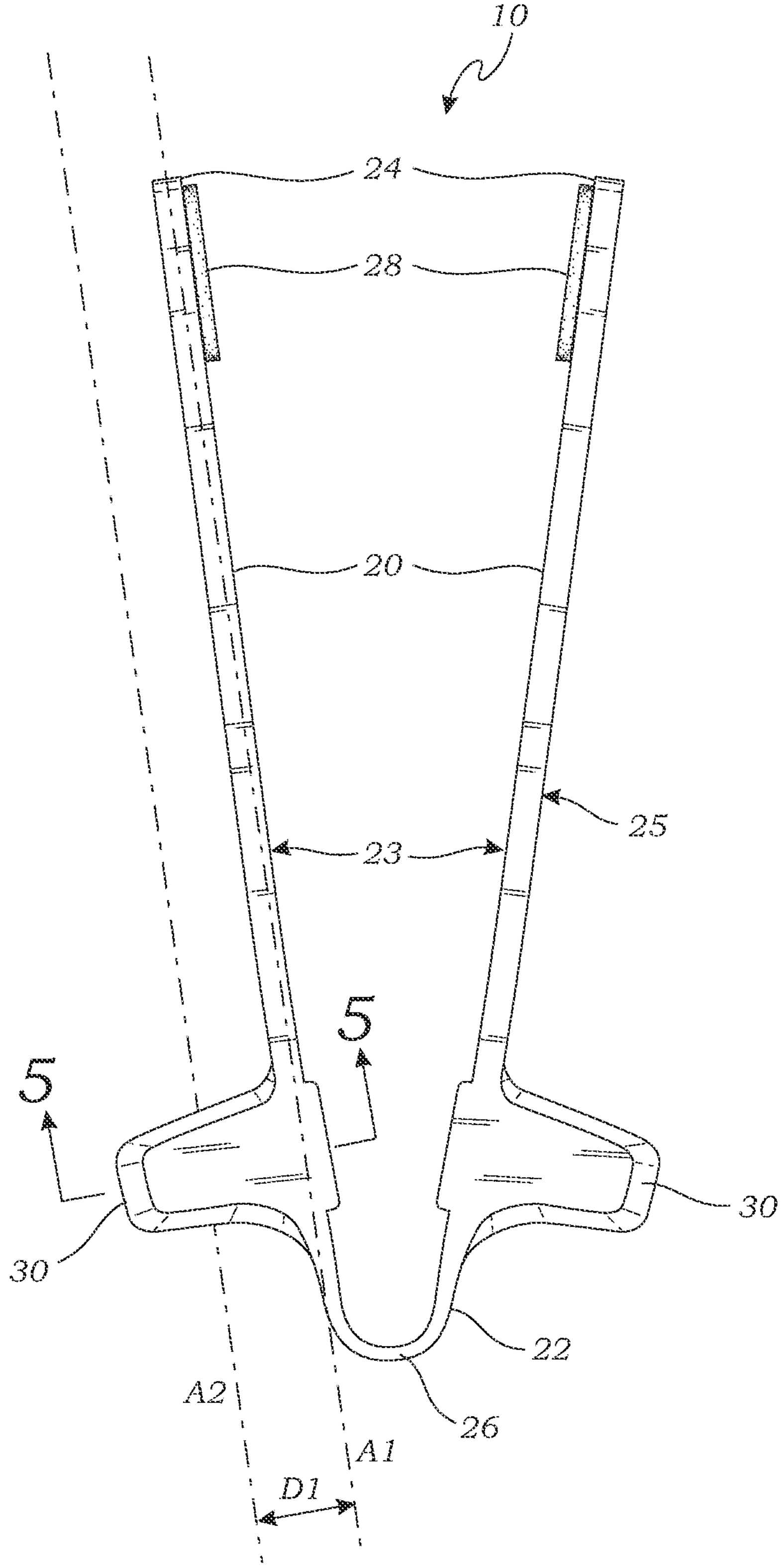
FIG. 3 is a top plan view of the grasping tool.
Figure 4:
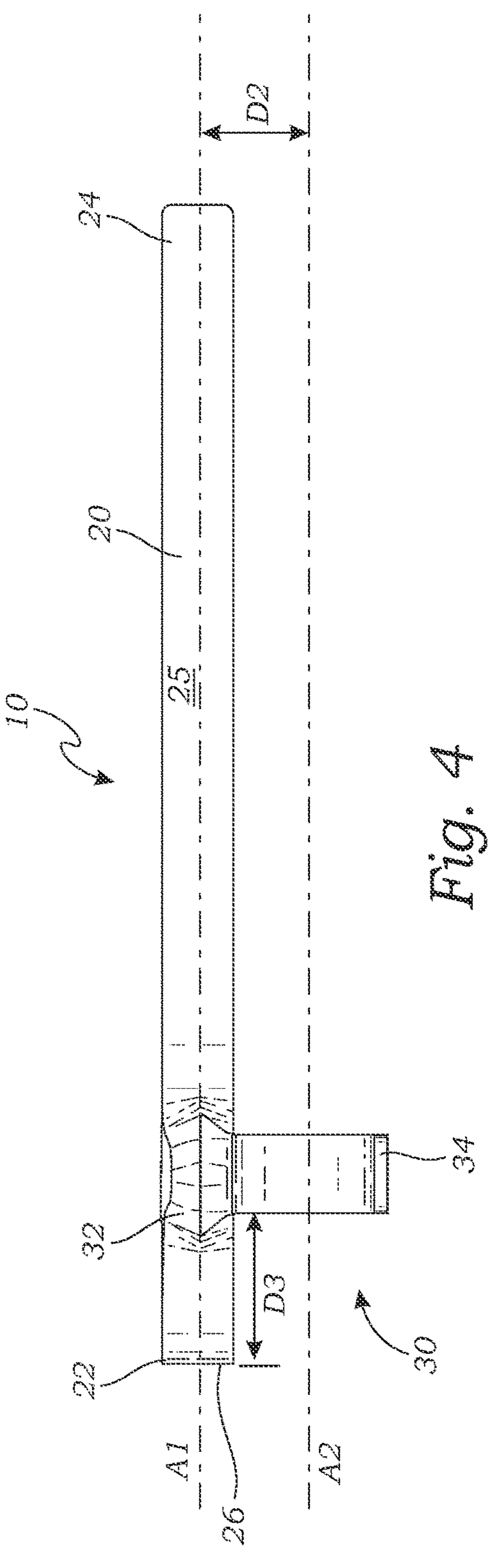
FIG. 4 is a side elevational view thereof.
Figure 5:
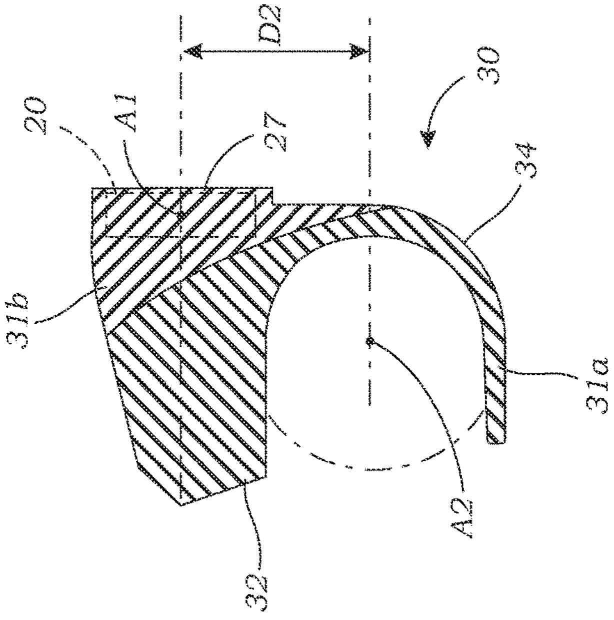
FIG. 5 is a sectional view thereof taken along line 5-5 in FIG. 3.

FIG. 3 is a top plan view of the grasping tool, and FIG. 4 is a side elevational view thereof. FIG. 5 is a sectional view of the grasping tool taken along line 5-5 in FIG. 3. As mentioned above, and as shown in FIGS. 3-5, each elongate arm 20 is generally disposed on a first axis A1 (generally speaking, and allowing for any potential curvature of the arms). As shown in FIGS. 3-5, each finger engagement element 30 is an annular shape that is disposed around a second axis A2.

In this embodiment, the second axis A2 that extends through the center of the finger engaging element 30 is approximately parallel to and located below the first axis A1 of the respective elongate arm 30, so that movement of the user's fingers enable manipulation of the elongate arm in concert therewith. Furthermore, the first and second axes A1 and A2 are spaced a lateral distance D1 from each other, and a vertical distance D2, so that the elongate arm 30 is positioned above the user's fingers while in use. As shown in FIG. 2, D1 and D2 are sized such that the pair of elongate arms 20 are positioned above the fingers of the user when the user's fingers are positioned through the finger engagement elements 30. In this embodiment, the distances D1 and D2 are each 0.2-1.0 inches, preferably about 0.5 inches, although this can obviously vary depending upon the size of the user's hands, and the preferences of the product designer.

As shown in FIG. 4, the finger engagement elements 30 are spaced a distance D3 from the hinge 26 at the proximal end 22. The distance D3 may be 5-25%, preferably 8-12%, of the length of the e elongate arms 20. In this case, it is about 0.5 inches, while the total length of the elongate arms 20 is about 12 inches.

Figure 6:
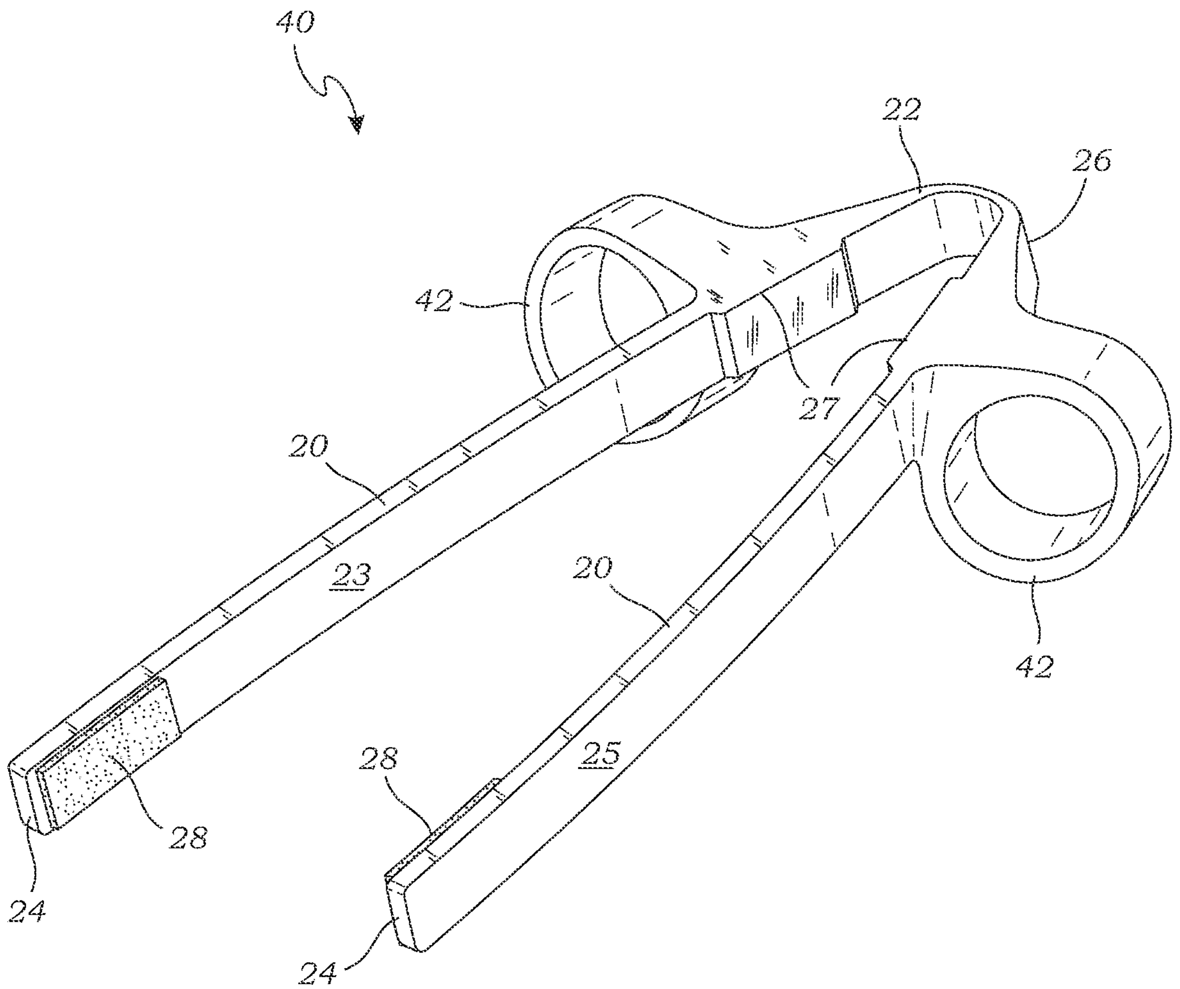
FIG. 6 is a perspective view of a second embodiment of the grasping tool wherein the finger engagement elements are in the form of a closed loop.

FIG. 6 is a perspective view of a second embodiment of the grasping tool 40 wherein finger engagement elements 42 are each in a fully annular, closed shape, which each fully encircle a finger of the user. In this embodiment, the grasping tool 40 may be fully or partially constructed of a food-grade stainless steel material, or other material suitable for handling foods. Other materials may be used, as deemed suitable for the consumer, for example, stainless steel material (or similar) may be desirable for use in cooking, plating food, etc. Alternatively, a softer or lighter material may be used, such as silicone, plastic, aluminum, etc., for general snacking or for disposable manufacturing. Furthermore, any suitable material may be used, in any desired context, provided the grasping tool 40 functions according to the claims of the present invention.

As used in this application, the words "a," "an," and "one" are defined to include one or more of the referenced item unless specifically stated otherwise. The terms "approximately" and "about" are defined to mean+/−10% (distance), or 25 degrees (in orientation), unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A grasping tool for enabling a user to grasp an item without using his or her fingers, the grasping tool comprising:

- a pair of elongate arms, each having a proximal end and a distal end and defining a first axis extending along the elongate arm;
- a living hinge disposed at and connecting the proximal ends of each of the pair of elongate arms;
- a gripping surface formed at the distal end of each of the elongate arms, the gripping surfaces of the elongate arms being shaped and configured for grasping the item therebetween; and
- a C-shaped finger engagement element extending from each of the elongate arms, each of the C-shaped finger engagement elements being spaced a distance from the living hinge that is in a range of 5-25% of the length of the respective elongate arm, leaving a distance between the C-shaped finger engagement element and the distal end of the respective elongate arm sufficient to permit the distal ends of the elongate arms to engage an item upon actuation of the grasping tool without a user's fingers contacting the item or adjacent items, each of the C-shaped finger engagement elements being open in a direction away from the C-shaped finger engagement element extending from the opposite one of the pair of elongate arms, defining a second axis parallel to and located below the first axis and the living hinge.

2. The grasping tool of claim 1, the C-shaped finger engagement elements being spaced an equal distance from the living hinge along the length of the respective elongate arm.

3. The grasping tool of claim 1, the pair of elongate arms and the living hinge being molded as a single unit.

4. The grasping tool of claim 1, the gripping surface formed at the distal end of each of the elongate arms being formed on an inner surface of the respective elongate arm, such that each of the gripping surfaces projects from its respective elongate arm in a direction toward the other gripping surface.

5. The grasping tool of claim 4, the gripping surface being textured.

* * * * *